Figure 1:
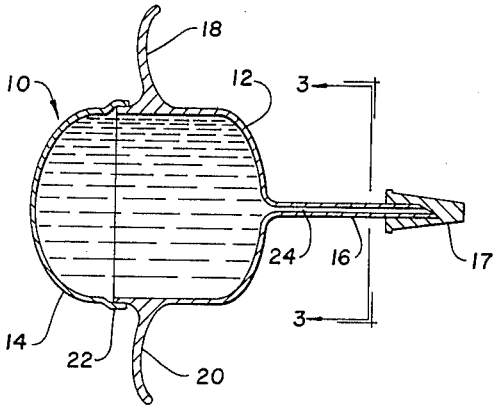
Figure 2:
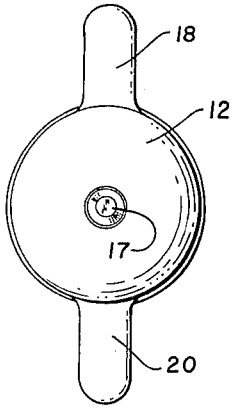
Figure 3:
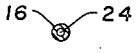
Figure 4:
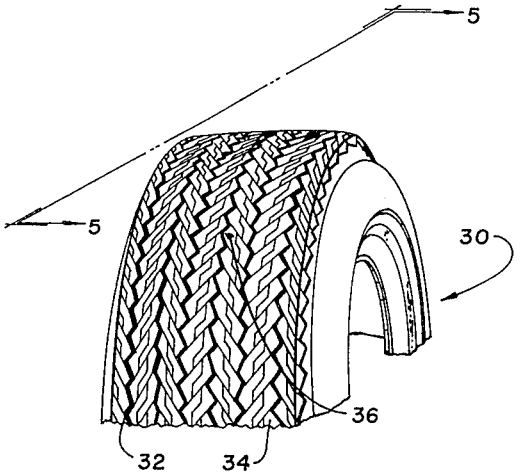
Figure 5:
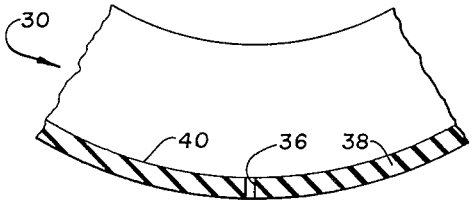
Figure 6:
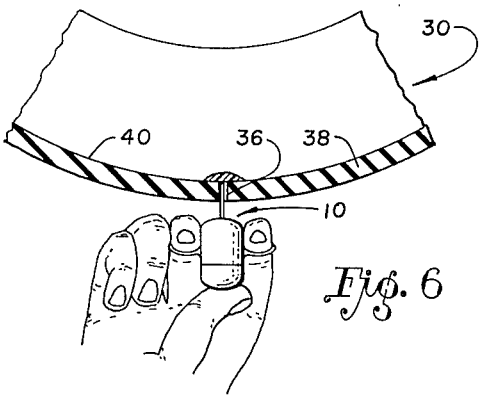
Figure 7:
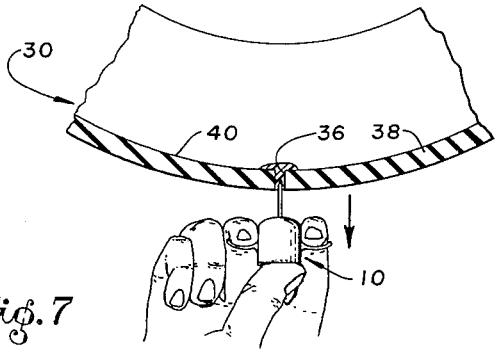
Figure 8:
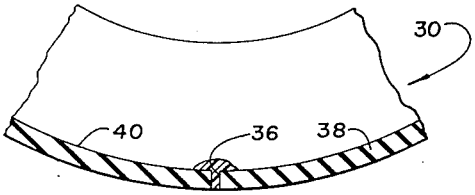

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 10

T939,014

METHOD AND DEVICE FOR MENDING RUPTURES IN BALLOON-TYPE ARTICLES

Thomas G. Fudge, 2021 Canterbury Road, Kingsport, Tenn. 37660; John J. Murphy, 8 Raphael Place, New Monmouth, N.J. 07748; and Lloyd P. Foster, 916 Scenic Court, Kingsport, Tenn. 37663

Continuation of abandoned application Ser. No. 266,807, June 27, 1972. This application June 11, 1974, Ser. No. 481,573

Int. Cl. B29h *5/16*

U.S. Cl. 264—36

2 Sheets Drawing. 9 Pages Specification

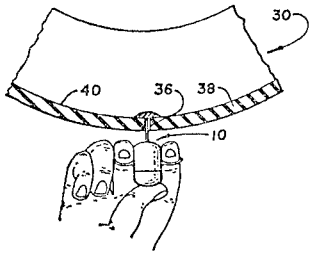

A method and device for mending ruptures in balloon-type articles such as vehicle tires is disclosed wherein polymerizable cyanoacrylate monomer is extruded into the rupture through a tube or needle. The needle is first inserted into the rupture where extrusion begins and continues simultaneously as the needle is withdrawn. The cyanoacrylate monomer is allowed to polymerize while maintaining the wall portion of said article in the vicinity of said rupture in substantially stationary contact.

METHOD AND DEVICE FOR MENDING REUPRUES IN A BALLOON-TYPE ARTICLES

Original Filed June 11, 1974